July 28, 1925.
H. ROHWER
1,547,687
COOLED COMPOSITE PISTON FOR INTERNAL COMBUSTION ENGINES
Filed July 7, 1922
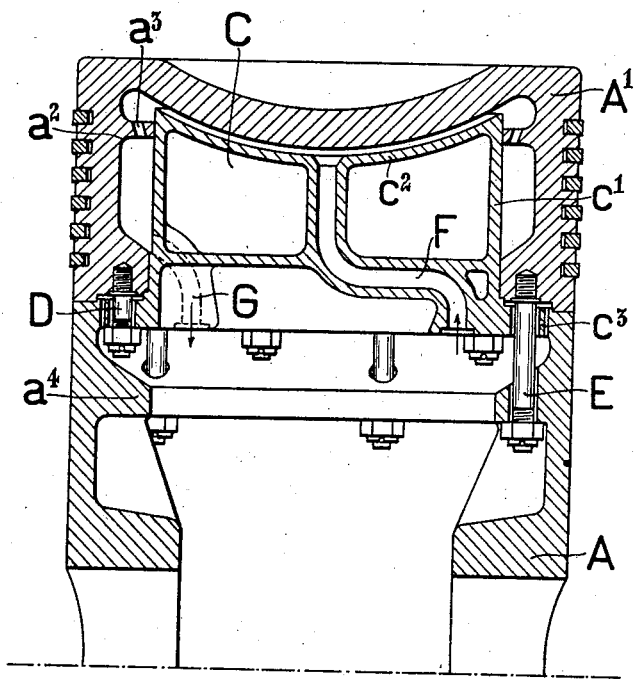
Inventor;
Heinrich Rohwer
By [signature]
Atty Patented July 28, 1925.

1,547,687

UNITED STATES PATENT OFFICE.

HEINRICH ROHWER, OF KIEL, GERMANY, ASSIGNOR TO FRIED. KRUPP AKTIENGE-SELLSCHAFT, GERMANIAWERFT, OF KIEL-GAARDEN, GERMANY.

COOLED COMPOSITE PISTON FOR INTERNAL-COMBUSTION ENGINES.

Application filed July 7, 1922. Serial No. 573,338.

*To all whom it may concern:*

Be it known that I, HEINRICH ROHWER, residing at Kiel, Germany, a citizen of the German Republic, have invented a certain new and useful Improvement in Cooled Composite Pistons for Internal-Combustion Engines, of which the following is a specification.

This invention relates to a piston for internal combustion engines which is provided with an inserted cooling chamber and the body of which is divided into two parts transversally with relation to the longitudinal axis of the piston.

The several parts of such pistons have hitherto been connected by providing the base flange of the cooling chamber with outwardly extending radial flaps serving to connect the chamber with the upper piston part. Fitting between the said flaps are similarly shaped inwardly extending radial flaps of the upper division flange of the lower piston half which flaps, on their part, serve to connect the two piston halves with one another. This mode of connection is very complicated and expensive and its influence on the strength of the piston is not a very favorable one. A serious drawback of this old arrangement further consists in that it does not permit the diameter of the cooling member to be increased so as to cause the cylindrical portion of the chamber to be located as close as possible to the cylindrical portion of the upper piston half whereby an efficient cooling of that piston portion can solely be attained. This drawback is based on the fact that the nuts of the connecting bolts interfere with each other as regards the space they occupy, so that it is rendered necessary to choose bolt circle diameters of different dimensions for the two kinds of connecting bolts.

Now, the present invention has for its object to obviate the said drawbacks, this object being essentially attained by arranging the abutments for the screw nuts used to connect the cooling chamber with the upper piston part, in a transverse plane other than that in which the screw nuts serving to connect the upper and lower piston parts, are situated, so that the nuts of one set will not restrict the space for the nuts of the other set.

The accompanying drawing illustrates, by way of example, as an embodiment of the subject-matter of the invention a vertical longitudinal section through a piston constructed in accordance with the invention.

The piston consists of a lower part A designed to receive the connecting rod and of an upper part $A^1$ which carries the piston-rings and which may be formed integrally with the piston head. The inserted cooling chamber C is of a shape similar to the upper part of the piston, that means, it possesses a cylindrical wall $c^1$ merging into a head $c^2$ which fits as tightly as possible to the piston head. The fastening of the cooling chamber C to the upper piston part $A^1$ is performed by means of screw bolts D with the aid of the base flange $c^3$ of the chamber. These connecting bolts are disposed outwardly as far as practically possible with regard to the walls of the piston parts A, $A^1$. The two piston parts A and $A^1$ are connected to each other by means of screw bolts E which have the same bolt circle diameter as the bolts D; their nuts are, however, disposed in a plane situated lower than the plane of the nuts of the bolts D and bear against an abutment provided to this end at the lower piston part A, said abutment being formed by an inwardly projecting collar $a^4$. The supply and discharge of the cooling medium takes place by the channels F and G, respectively. The upper piston part $A^1$ is provided with an inwardly projecting collar $a^2$ which is designed, on the one hand, to center the cooling chamber C and which is provided with small passage openings $a^3$, the arrangement of which will cause, on the other hand, the cooling medium to accumulate in the hollow space situated above the collar, thereby securing a particularly efficient cooling of the upper corners of said hollow space.

The described arrangement and construction of the connecting bolts renders it possible to dispose the cylindrical wall of the cooling chamber very close to the cylindrical wall of the upper piston part so as to attain not only a good cooling of the piston head but at the same time a highly efficient cooling of the cylindrical portion of the upper piston half. Another advantage resides in that the length of the connecting bolts E caused by the described construction, makes these bolts specially fit for resisting heat stresses.

I claim:

1. A piston for internal combustion engines comprising an inserted cooling chamber and a body divided into two parts transversely with relation to the longitudinal axis of the piston, screw bolts and nuts for connecting the cooling chamber with the upper piston part and the piston parts with each other, cooperating abutments on the cooling chamber and piston parts for the several nuts, the abutments for the nuts used in the connection of the cooling chamber with the upper piston part being situated in another transverse plane than the abutments for the nuts used in the connection of the two piston parts with each other.

2. A piston for internal combustion engines comprising an inserted cooling chamber and a body divided into two parts transversely with relation to the longitudinal axis of the piston, screw bolts and nuts for connecting the cooling chamber with the upper piston part and the piston parts with each other, abutments on the piston parts for the several nuts, the abutments for the nuts used in the connection of the cooling chamber with the upper piston part being situated in circumferential alignment but in another transverse plane than the abutments for the nuts used in the connection of the two piston parts with each other.

3. A piston for internal combustion engines comprising an inserted cooling chamber and a body divided into two parts transversely with relation to the longitudinal axis of the piston, circumferentially aligned abutments on the piston parts and cooling chamber, the abutments on one piston part and on the cooling chamber being situated in another transverse plane than the abutment on the other piston part and screw bolts and nuts for connecting the cooling chamber and piston parts, some of said bolts passing through the abutments on both piston parts and on said cooling chamber.

The foregoing specification signed at Kiel, Germany, this 2nd day of June, 1922.

HEINRICH ROHWER.